United States Patent [19]

Gaudeul

[11] 4,041,281

[45] Aug. 9, 1977

[54] APPARATUS FOR THE ANALYSIS OF THE OPERATION OF A SYSTEM USING BINARY SIGNALS

[75] Inventor: Bruno Gaudeul, Versailles, France

[73] Assignee: Iria Institut de Recherche D'Informatique et D'Automatique, Le Chesnay, France

[21] Appl. No.: 687,605

[22] Filed: May 18, 1976

[30] Foreign Application Priority Data

May 23, 1975 France .................................. 75.16194

[51] Int. Cl.² .............................................. G07C 3/10
[52] U.S. Cl. .............................. 235/92 PD; 235/92 T; 235/92 DP; 235/92 R
[58] Field of Search ........... 235/92 T, 92 PD, 92 DP, 235/922 TF

[56] References Cited

U.S. PATENT DOCUMENTS

| 3,399,298 | 8/1968 | Taylor | 235/92 T |
| 3,448,459 | 6/1969 | Margolis | 235/92 T |
| 3,599,091 | 8/1971 | Warner | 235/92 T |
| 3,670,147 | 6/1972 | Wright | 235/92 T |
| 3,793,512 | 2/1974 | Lorenzen | 235/92 T |
| 3,876,869 | 4/1975 | Houpt | 235/92 T |

*Primary Examiner*—Joseph M. Thesz

[57] ABSTRACT

Apparatus for the analysis of the operation of components using binary signals, such as computer components, each of the components being associated with a counter, which can either count and display the number of times the component has been activated during a given time period, or count the time length of those activations. Reset means are provided at the end of the period. The mean value of those numbers can be computed and displayed.

5 Claims, 2 Drawing Figures

APPARATUS FOR THE ANALYSIS OF THE OPERATION OF A SYSTEM USING BINARY SIGNALS

This invention relates to apparatus for the analysis of the operation of a data processing system where the information is transmitted by means of binary signals.

It has already been suggested to analyze the operation of a data processing system using binary signals by sampling said signals and by counting them during a predetermined time period. The apparatus of this type known up to now are of a relatively complicated constitution and, thus, of a high cost price. Moreover, they provide relatively small amount of information.

The apparatus according to this invention is on the contrary of a simple constitution and provides a larger amount of information than was possible up to now.

The apparatus according to this invention comprises, for the analysis of a component the activity of which corresponds to one of two values 1 or 0, a counter which displays its contents after a predetermined time interval, or period, measured by counting the pulses provided by an oscillator, and is characterized by the fact that the counter can as desired be brought in a condition for which it counts the number of pulses of the oscillator during the activation time periods, and in another condition for which it counts the activation periods themselves.

In one embodiment, said counter is preceded by an AND gate made operational for the first condition and the inputs of which are connected respectively with the oscillator and with said component, and made non-operational in the second condition in which the counter is connected directly with said component.

According to this invention, also, a counter connected with the oscillator, the filling of which defines the period, is connected with a counter counting the number of fillings, the information carried by which is applied to a divider itself connected with the counters associated with the various components, the result of the divisions giving the means values of the values furnished by the components' counters at the end of the counting periods, said mean values being information regarding the operation of the components during the time interval the apparatus is switched on.

The following description, given as an example, is made with reference to the accompanying drawing in which.

Figure 1:
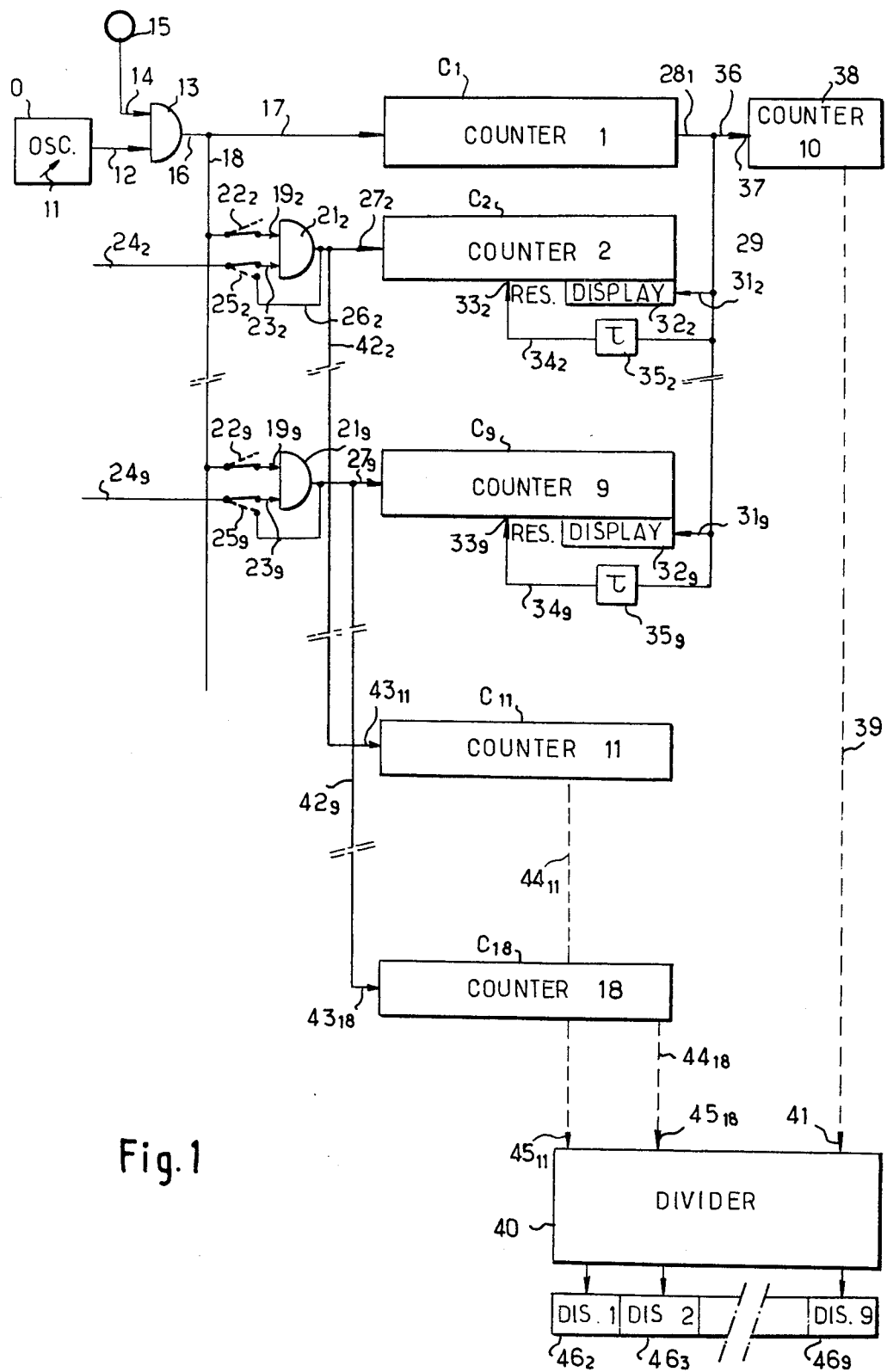
FIG. 1 is a diagram of an apparatus according to this invention.

This apparatus comprises an oscillator O which provides impulses at regular time intervals, for example a step by step adjustable frequency ranging from 1 MHz to 555.5 Hz, means 11 being provided for this adjustment. The output 12 of the oscillator O is applied to the input of an AND gate 13, the other input of which 14 is connected with an off and on control device 15 enabling the application of one or the other of two values at the input 14, only one of which enables validation of the voltage present at the other input 12.

The output 16 of the AND gate 13 is divided between a first branch 17 applied to a first counter $C_1$, of a capacity of $10^6$, this numerical indication being only given as an example.

The second branch 18 is connected with the inputs $19_2, \ldots, 19_9$ of AND gates $21_2, \ldots, 21_9$ provided at the input end of counters $C_2 \ldots C_9$ in the case, chosen as an example, where eight counters are associated with counter $C_1$.

The counters $C_2 \ldots C_9$ are preferably of binary coded decimal type.

Between the branch 18 and the inputs 19 of the AND gates 21 are switches $22_2 \ldots 22_9$. Said switches can be controlled manually or remotely.

The second inputs $23_2 \ldots 23_9$ of the AND gates 21 are connected through lines $24_2 \ldots 24_9$ to circuits carrying signals, one of the two values of which 1 or 0 translates the activity of a component, for example of a component part of a computer. The lines 24 are preferably ended by high impedance probes making samples on said circuits without influencing the operation of the components.

The connections between lines 24 and the inputs 23 are made through switches, respectively $25_2 \ldots 25_9$, linked to switches $22_2 \ldots 22_9$ in such a manner that for an AND gate 21 the switches 22 and 25 are either simultaneously in open condition or simultaneously in closed condition relative to the input circuits 19 and 23.

When it is in an open condition relative to an input circuit 23, a switch 25 is in a closed condition relative to a circuit 26 connecting directly the inputs $27_2 \ldots 27_9$ of the counters $C_2 \ldots C_9$ to the corresponding lines respectively $24_2 \ldots 24_9$.

At the output $28_1$ of the counter $C_1$ a signal is present when said counter $C_1$ is full, said counter being of a type resetting itself as soon as it is full to take up counting again afterwards.

The output $28_1$ is connected through a line 29 with the inputs $31_2 \ldots 31_9$ of displaying means $32_2 \ldots 32_9$ adjoined respectively to the counters $C_2 \ldots C_9$. The line 29 is moreover connected with the resetting inputs $33_2 \ldots 33_9$ of the counters $C_2 \ldots C_9$ through circuits $34_2 \ldots 34_9$ with time constant $\tau$ schematically shown at in $35_2 \ldots 35_9$.

A second line 36 connected to the output $28_1$ is coupled to an input 37 of a counter 38 which advances by one unit each time the counter $C_1$ is full.

The counting value of the counter 38 is applied through a circuit 39 to the input 41 of a divider 40 to constitute the division factor of the divider.

The inputs $27_2 \ldots 27_9$ of the counters $C_2 \ldots C_9$ are connected through circuits $42_2 \ldots 42_9$ to inputs $43_{11} \ldots 43_{18}$ of counters $C_{11} \ldots C_{18}$, preferably of binary type.

The values counted by the counters $C_{11} \ldots C_{18}$ are applied through circuits, respectively $44_{11} \ldots 44_{18}$, to inputs $45_{11} \ldots 45_{18}$ of the divider 40, which is adapted to make the divisions of said values by the division factor introduced via its input 41.

To the divider 40 are adjoined displaying means $46_2 \ldots 46_9$ where appear the results of the division, by the value introduced at input 41, of the values introduced respectively at the inputs $45_{11} \ldots 45_{18}$.

The operation is as follows

When the switches 22 and 25 are in the conditions shown in solid lines, in which they connect the inputs of the AND gates 21 respectively to branch 18 and to the lines 24, the switching on of the apparatus through the manipulation of device 15, causes, on the one hand, the counting by counter $C_1$ of the pulses emitted by oscillator O, and on the other hand, when one of the counters $C_2$ to $C_9$ is validated by the activation of the component to which it is coupled through the corresponding line 24, the counting of the pulses applied at the input 27 of the counter during the validation time.

When the counter $C_1$ is full, that is after a predetermined time period, depending on the value of the frequency chosen for the oscillator O, each one of the displaying means 32 receives a command from output $28_1$ of counter $C_1$ and displays the number of pulses counted during said period by the counter to which it is associated. The displayed value is representative of the time of activity of the component, for example a computer subset, during a period of time corresponding to the filling of counter $C_1$. The displaying means comprises a memory means which maintains the displaying until the end of the following period.

Just after the displaying, the counters $C_2 \ldots C_9$ are reset, the intervention of the time constants 35 insuring displaying before resetting.

If so desired, a pair of switches associated with one of the AND gates, for example gate $21_2$, is opened. In this new condition, shown in dotted lines, the counter $C_2$ is connected directly to line $24_2$. During the counting period, it counts the number of activations of the component to which line $24_2$ is coupled. The displaying device $32_2$ informs then on this number of activations during the period necessary for the filling of counter $C_1$.

An embodiment is provided according to which two counters are associated with to the same line, in such a way that it is possible to have simultaneously, for the component connected to said line, information relative to the time duration of activation of said component during a counting period and information relative to the number of its activations.

At each filling of counter $C_1$, the division factor applied through input 41 to the divider 40 increases by one unit. The displaying means $46_2$, $46_3 \ldots 46_9$ provide an indication relative to the mean value of the values displayed on displaying means $32_2 \ldots 32_9$ during all the time which has elapsed from the switching on of the apparatus to the time of observation.

Figure 2:
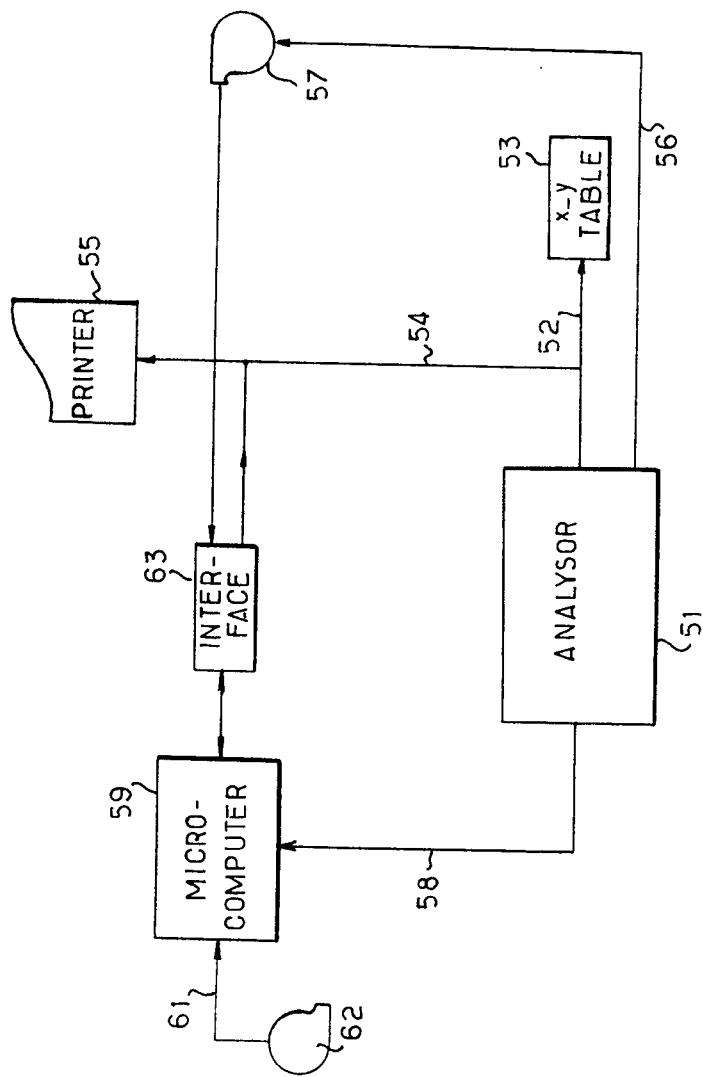
FIG. 2 is a diagram of a system comprising said apparatus.

The system shown on FIG. 2 comprises an apparatus 51 of the type just described connected through a circuit 52 to an X - Y table 53, and through a circuit 54 to a printer 55.

The apparatus 51 is moreover connected through a circuit 56 to a cassette recording means 57 and through a circuit 58 to a microcomputer 59. This microcomputer is connected through a circuit 61 to a recorder or cassette reading means 62. The recorder 57 is connected to the microcomputer 59 through an interface device 63, interposed also between the microcomputer 59, the X-Y table 53 and the printer 55.

What is claimed is:

1. An apparatus for the analysis of the operation of components using binary signals, such as computer components, comprising:
    an oscillator constituting an adjustable time basis, and provided with an output;
    a plurality of probes activated by the operation of said components;
    a plurality of counters provided with reset inputs, each counter being associated with a respective one of said probes;
    a displaying means connected to each counter;
    logical connection means between each counter and, on the one hand, the associated probe and on the other hand the output of the oscillator;
    activating means controlling said connection means such that each counter can count either the number of state changes of the oscillator during the activation periods of the associated probe, or the number of the activations of said probe; and
    a driving counter having an input and an output, said input being connected to the output of said oscillator and said output being connected to the reset input of each counter, in order for the probe-associated counters to be reset each time the count in the driving counter is completed, and to the displaying means.

2. The apparatus according to claim 1, in which the displaying means comprises means for displaying the value reached by the probe-associated counter to which it is connected when the count in the counter is completed and means for continuously displaying said value until the next completion of the count in said driving counter.

3. The apparatus according to claim 2, further comprising time delay means between the output of said driving counter and the reset input of each probe-associated counter, in order for the displaying means to be activated before the resetting of the counters.

4. The apparatus according to claim 1, wherein said logical connection means comprises: a double switch having two outputs and two inputs receiving respectively the output of the associated probe and the output of said oscillator; an AND gate having two inputs respectively connected to the outputs of said double switch and one output connected to the associated counter and to one of the outputs of said double switch.

5. The apparatus according to claim 1, further comprising cumulative counters having inputs connected respectively to the inputs of the counters associated with the probes, and a ratio-forming circuit having a divisor input connected to a counter counting the number of completed countings in the driving counter and dividend inputs connected to outputs of said cumulative counters.

* * * * *